United States Patent Office 2,838,469
Patented June 10, 1958

2,838,469

BLENDS AND COPOLYMERS OF POLYMERIZED ACETYLENE AND METHOD OF MOLDING SAME

Alio J. Buselli, New Providence, and Arthur V. Tobolsky, Princeton, N. J., assignors to Air Reduction Company, Incorporated, New York, N. Y., a corporation of New York No Drawing. Application March 25, 1953
Serial No. 344,672

14 Claims. (Cl. 260—45.5)

This invention relates to polymer blends and has for its object the provision of blended products comprising polyacetylene, sometimes called cuprene or carbene, and polybutadiene-containing elastomers and molded articles made from the blends. The invention not only covers blends formed of polyacetylene but blends formed of chlorinated polyacetylene. The blended products of the invention comprise polyacetylene and polybutadiene or G. R. S. rubber (a copolymer of butadiene and styrene) blended in any suitable mechanical kneading or working operation. The polymer blends can be molded to give solid objects having good physical, machining, chemical, and electrical properties. The highly cross-linked molded articles show no softening point and have excellent resistance to oxidative degradation, even at elevated temperatures.

The two polymers are incompatible and must be broken down in a milling operation, the polyacetylene serving as a reactive filler. The polymer blends may be formed by milling the components thereof in mechanical kneading, smearing or sheeting operations of the type commonly used in blending rubber and other plastics and the blended product or stock may be cut into any suitable shape as strips, ribbons, or shreds to facilitate their use, as in molding. These operations are advantageously carried out at temperatures varying from 100° to 120° C. and temperatures within this range do not appear to affect the moldability of the blends. Polymer blends of polybutadiene-containing elastomers may be prepared in various proportions by weight, varying, say, from 25% to 75% of polyacetylene or chlorinated polyacetylene. The polymer blends may be molded in ordinary molds or injection molded under pressure and at elevated temperatures, preferably below 300° C.

Polybutadiene-polyacetylene blends before molding have a lower tensile strength and are less rubbery than pure polybutadiene. They may be easily shredded to the desired size and shape for injection molding. The flow, for example, of a 1:1 ratio blend of the two polymers before molding was M (medium on the thermoplastic scale).

The polymer blends of polyacetylene and polybutadiene in varying ratios of, say, 3:1, 1:1, or 1:3, by weight, may be molded at low pressures, say, from 500 to 9000 p. s. i., and at temperatures ranging from 200° C. to 300° C. to produce molded pieces that are well knit, smooth and with sharp edges.

Chlorinated polyacetylene containing any desired amount of chlorine, for example from 0% to 40%, and polybutadiene in suitable proportions may be compression molded at 250° C. in less time than the non-chlorinated polyacetylene. For example, a polymer containing 14% chlorine may be compression molded at 250° C. in thirty (30) minutes or almost instantly at 300° C.; however, at 300° C. some cracking may develop.

Polyacetylene and chlorinated polyacetylene appear to be reactive fillers for unsaturated elastomers and resins that are stable to high temperature compression and injection molding operations without exercising any material adverse effect. The molded pieces showed no tendency to deform at temperatures up to 300° C. and showed little cold flow. Both impact strength and hardness are subject to conditions of molding.

Blends of G. R. S. rubber and polyacetylene in varying proportions by weight, for example, from 25% to 75% of polyacetylene, have similar properties but the curing process is faster and requires lower temperatures than blends of polybutadiene and polyacetylene. Effective molding temperatures of polyacetylene and G. R. S. rubber range from 200° C. to 250° C.

The molded articles of the polymer blends of the invention may be cured outside the mold after first preforming at moderate temperatures. It appears to be advantageous to subject the articles, especially polybutadiene blends, to a preforming stage at a temperature of around 200° C. The molded articles may be held in the mold during the entire curing period or they may be removed from the mold and placed in a curing oven or chamber.

The following table illustrates the conditions of molding two-inch diameter discs of polyacetylene and polybutadiene, chlorinated polyacetylene and polybutadiene, and polyacetylene and G. R. S. rubber, and describes certain properties of the molded discs:

Table I

| No. | Substance | Temp., °C.1 | Pressure, p. s. i. | Time, Minutes | Results |
|---|---|---|---|---|---|
| 1 | 50% Polyacetylene<br>50% Polybutadiene | 300 | 5,000 | 0 | Hard disc, high rebound elasticity. |
| 2 | 50% Polyacetylene<br>50% Polybutadiene | 300 | 5,000 | 30 | Do. |
| 3 | 50% Polyacetylene<br>50% Polybutadiene | 300 | 5,000 | 60 | Hard disc, cracked. |
| 4 | 50% Polyacetylene<br>50% Polybutadiene | 300 | 2,000 | 15 | Somewhat rubbery. |
| 5 | 50% Polyacetylene<br>50% Polybutadiene | 300 | 2,000 | 30 | Solid hard disc. |
| 6 | 50% Polyacetylene<br>50% Polybutadiene | 300 | 2,000 | 60 | Hard disc but cracked. |
| 7 | 50% Polyacetylene<br>50% Polybutadiene | 300 | 2,000 | 30 | Hard disc, good rebound elasticity. |
| 8 | 50% Polyacetylene<br>50% Polybutadiene | 300 | 2,000 | 0 | Somewhat rubbery. |
| 9 | 50% Polyacetylene<br>50% Polybutadiene | 300 | 2,000 | 60 | Hard disc, not cracked. |
| 10 | 50% Chlorinated (14% Cl) polyacetylene<br>50% Polybutadiene | 250 | 5,000 | 30 | Hard solid disc obtained. |
| 11 | 50% Chlorinated (14% Cl) polyacetylene<br>50% Polybutadiene | 300 | 5,000 | 0 | Very hard disc obtained. Appeared brittle. |

Table I—Continued

| No. | Substance | Temp., °C.[1] | Pressure, p. s. i. | Time, Minutes | Results |
|---|---|---|---|---|---|
| 12 | 39% Polybutadiene / 26% Carbon Black / 35% Polyacetylene | 300 | 5,000 | 30 | Very hard disc obtained, negligible cold flow characteristics. |
| 13 | 50% Polyacetylene / 50% Polybutadiene | 210 | 6,000 | 0 | Good disc formed, but soft and rubbery. |
| 14 | 50% G. R. S. rubber / 50% Polyacetylene | 250 | 5,000 | 0 | Hard slightly flexible disc formed. |
| 15 | 50% G. R. S. rubber / 50% Polyacetylene | 300 | 3,000 | 30 | Very hard disc obtained. Appeared very brittle. |
| 16 | 50% G. R. S. rubber / 50% Polyacetylene | 230 | 3,000 | 30 | Hard disc obtained. |
| 17 | 50% G. R. S. rubber / 50% Polyacetylene | 210 | 3,000 | 15 | Good disc obtained, slightly rubbery. |
| 18 | 75% Polyacetylene / 25% Polybutadiene | 300 | 1,000 | 0 | Hard disc with excellent rebound characteristics. |

[1] Maximum temperature reached during heating.

For example, articles molded of blends of 50% polyacetylene and 50% polybutadiene at 300° C. and 3000 p. s. i. have dissipation factors measured at 1 mc. of from 0.005 to 0.04 and dielectric constants of from 2.5 to 3.0 depending on the time of heating in the mold, say, from 15 minutes to 45 minutes. By way of comparison, general purpose Bakelite and hard rubber have dielectric constants of 7.0 and 2.8 respectively.

The highly cross-linked polymers showed very little cold flow properties. Some specimens, for example, specimen 12 of Table I, had better cold flow properties than nylon-fiber glass laminates.

The thermal stability of 1:1 (by weight) polyacetylene-polybutadiene molded discs at 700° C. in an inert atmosphere of purified nitrogen is about the same as polyacetylene; however, the article may lose as much as 25% of its original weight. Moreover, articles heated to such temperatures will probably undergo considerable cracking.

The impact resistances of molded polyacetylene-polybutadiene blends were determined according to A. S. T. M. Standards D256–47T, Izod type, and the hardness by Standard D785–48T, except that the specimens were not conditioned. Specimens varying from 25% to 50% polyacetylene by weight with the balance polybutadiene, had impact resistances in foot pounds per inch of notch of from 0.23 to 0.44 and Rockwell hardness of M73 to M88. The impact strength and hardness of these molded polymer blends are generally better than the phenolics and polyacetylene. The mechanical properties of the polymer blends are very desirable and not only compare favorably in many respects to the properties of general purpose Bakelite and hard rubber but in some respects are superior.

The following table shows the Rockwell hardness of several specimens of polyacetylene-polybutadiene blends:

Table II

| Composition | Molding Conditions | | | Rockwell Hardness |
|---|---|---|---|---|
|  | Temp., °C. | Pressure, p. s. i. | Time, Min. |  |
| 50% Polyacetylene | 300 | 6,000 | 30 | M 103 |
| Do | 300 | 9,000 | 15 | M 75 |
| Do | 300 | 9,000 | 15 | M 85 |
| Do | 300 | 7,000 | 15 | M 85 |
| 75% Polyacetylene | 300 | 5,000 | 15 | M 113 |
| Do | 300 | 5,000 | 0 | M 101 |
| 0 Polyacetylene | 300 | 1,000 | 0 | M 30 |

In general it has been observed that mild changes in pressure have no significant effect on either the curing rate or the mechanical properties of the molded articles. From Table II it appears that the higher the concentration of polyacetylene, the more rapid the cure.

In determining the solvent swell properties, 2-inch discs were immersed in a suitable solvent until solvent solute equilibrium was reached. Benzene and carbon tetrachloride, two of the best solvents for non-cross-linked polybutadiene were used. The samples were weighed before and after immersion in solvent.

The following table illustrates the solvent swell of polybutadiene-containing blends:

Table III

| Material Composition | Molding Procedure | Solvent | Time, Hrs. | Percent Increase in Weight |
|---|---|---|---|---|
| 50% Carbon Black / 50% Polyacetylene | ½ hr., 300° C. | Benzene | 66 | 7.2 |
| Do | do | do | 66 | 6.8 |
| Do | ½ hr., 240° C. | Carbon Tetrachloride. | 24 | 30.0 |

When polyacetylene or noncross-linked polybutadiene is placed in a steel bomb containing oxygen at 150 p. s. i. and the temperature is increased slowly, a sharp rise in temperature and pressure occurs between 115–150° C.; this temperature is the oxygen stability temperature. Since saturated polymers such as polyethylene have greater oxygen stability, approximately 210° C., it appears that the low oxygen stability is due to the residual unsaturation in polybutadiene and polyacetylene. The oxygen stability of highly cross-linked polybutadiene and the 1:1 polyacetylene blend are very similar, being in the range of 360–370° C. Only when a large excess of polyacetylene is present, such as the 1:2 weight ratio, does the oxygen stability show a marked drop. It appears then, that not only is the oxygen reactivity of polybutadiene greatly decreased but also that of polyacetylene. These facts are in agreement with the present belief that polyacetylene behaves as a reactive filler and that during the curing cycle a true chemical reaction is occurring. The low values of solvent adsorption in Table III also tend to indicate this fact. Solvent swell of the last test of Table III as measured by linear dimensional change is approximately 15% after 24 hours immersion. Polybutadiene baked alone at 255° C. for 3 days showed a solvent swell of approximately 20%. This also is in agreement with the probability that polyacetylene acts as a reactive filler when the polymer blends are molded at high temperatures.

We claim:

1. A polymer blend comprising cuprene and a synthetic elastomer selected from the group consisting of polybutadiene and a copolymer of butadiene and sytrene.

2. A molded article formed by molding under pressure and at an elevated temperature a polymer blend comprising cuprene and a synthetic elastomer selected from the group consisting of polybutadiene and a copolymer of butadiene and styrene.

3. A polymer blend comprising chlorinated cuprene and a synthetic elastomer selected from the group consisting of polybutadiene and a copolymer of butadiene and styrene.

4. A molded article formed by molding under pressure and at an elevated temperature a polymer blend comprising chlorinated cuprene and a synthetic elastomer selected from the group consisting of polybutadiene and a copolymer of butadiene and styrene.

5. A polymer blend comprising cuprene and polybutadiene in the range of ratios by weight of from 1:3 to 3:1.

6. A polymer blend comprising cuprene and a copolymer of butadiene and styrene in the range of ratios by weight of from 1:3 to 3:1.

7. The method of forming molded articles which comprises blending cuprene and polybutadiene, and molding articles of the polymer blends at a temperature of at least 200° C. and at a pressure of at least 500 p. s. i.

8. The method of forming molded articles which comprises blending cuprene and a copolymer of butadiene and styrene, and molding articles of the polymer blends at a temperature of at least 200° C. and at a pressure of at least 500 p. s. i.

9. The method of forming molded articles which comprises blending chlorinated cuprene and polybutadiene, and molding articles of the polymer blends at a temperature of at least 200° C. and at a pressure of at least 500 p. s. i.

10. The method of forming molded articles which comprises blending chlorinated cuprene and a copolymer of butadiene and styrene, and molding articles of the polymer blends at a temperature of at least 200° C. and at a pressure of at least 500 p. s. i.

11. A polymer blend comprising a cuprene selected from the group consisting of cuprene and a chlorinated cuprene and a synthetic elastomer selected from the group consisting of polybutadiene and a copolymer of butadiene and sytrene.

12. A molded article formed by molding under pressure and at an elevated temperature a polymer blend comprising a cuprene selected from the group consisting of cuprene and a chlorinated cuprene and a synthetic elastomer selected from the group consisting of polybutadiene and a copolymer of butadiene and styrene.

13. A polymer blend comprising a cuprene selected from the group consisting of cuprene and chlorinated cuprene and a synthetic elastomer selected from the group consisting of polybutadiene and a copolymer of butadiene and styrene in the range of ratios by weight of said cuprene to said synthetic elastomer of from 1:3 to 3:1.

14. The method of forming molded articles which comprises blending a cuprene selected from the group consisting of cuprene and chlorinated cuprene and a synthetic elastomer selected from the group consisting of polybutadiene and a copolymer of butadiene and styrene, and molding articles of the polymer blends at a temperature of at least 200° C. and at a pressure of at least 500 p. s. i.

References Cited in the file of this patent

UNITED STATES PATENTS

| | | |
|---|---|---|
| 1,522,822 | Kuhn | Jan. 13, 1925 |
| 2,213,423 | Wiezevich | Sept. 3, 1940 |

FOREIGN PATENTS

| | | |
|---|---|---|
| 667,863 | Germany | Nov. 22, 1938 |

OTHER REFERENCES

The GR-S Manual, page 38, published by Imperial Chemical Industries, Ltd., Dyestuffs Division, 1947.